United States Patent [19]

Champenois

[11] 4,132,841
[45] * Jan. 2, 1979

[54] COPOLYMERS OF DYES AND ACRYLAMIDE

[75] Inventor: Michel M. L. Champenois, Le Mesnil Esnard

[73] Assignee: Produits Chimiques Ugine Kuhlmann, Paris, France

[*] Notice: The portion of the term of this patent subsequent to Jun. 6, 1995, has been disclaimed.

[21] Appl. No.: 762,372

[22] Filed: Jan. 25, 1977

Related U.S. Application Data

[63] Continuation-in-part of Ser. No. 601,010, Aug. 1, 1975.

[30] Foreign Application Priority Data

Aug. 2, 1974 [FR] France ................................. 74 26846

[51] Int. Cl.$^2$ ............................................. C08F 212/32

[52] U.S. Cl. ................................... 526/221; 260/875; 260/883; 260/895; 260/159; 260/281; 260/314.5; 526/280; 526/284; 526/287; 260/326 R; 260/377; 548/357

[58] Field of Search .............. 260/79.3 MU, 875, 883, 260/895; 526/11.1, 280, 284, 221

[56] References Cited

U.S. PATENT DOCUMENTS

| | | | |
|---|---|---|---|
| 2,620,324 | 12/1952 | Coover et al. | 260/883 |
| 2,805,218 | 9/1957 | Towne et al. | 260/883 |
| 2,895,967 | 7/1959 | Staley et al. | 260/883 |
| 2,976,294 | 3/1961 | Firestine | 260/47 UA |
| 3,503,087 | 3/1970 | Wolf et al. | 8/164 |
| 3,637,596 | 1/1972 | Gulbins et al. | 260/310 |

Primary Examiner—Harry Wong, Jr.
Attorney, Agent, or Firm—Beveridge, DeGrandi, Kline & Lunsford

[57] ABSTRACT

Copolymers of acrylamide and dyes useful as reactive prepolymers for the preparation of structurally dyed water-insoluble macromolecular materials. The dyes have a polymerizable double bond, such as maleimido, acryloylamino or cyanovinyl groups.

3 Claims, No Drawings

COPOLYMERS OF DYES AND ACRYLAMIDE

REFERENCE TO A RELATED APPLICATION

This application is a continuation-in-part of my copending application, Ser. No. 601,010 filed Aug. 1, 1975 which application is relied on herein and the benefit of which is claimed.

The present invention relates to copolymers of dyes and acrylamide that may be used as reactive prepolymers for the production of structurally dyed, water insoluble, macromolecular materials; that is to say, macromolecular materials wherein the copolymerized dye forms an integral part of the macromolecular chain.

It is known how to copolymerize monomers such as styrene, acrylonitrile, vinyl chloride, vinyl acetate, and the like, with dyes having groups capable of taking part in the polymerization reaction. In general, these dyes are slightly soluble in water or in the respective monomers and their reactivity is rather slight. Copolymerization of the dyes and monomers requires temperatures and reaction times much higher than polymerization of the base monomers alone. On the other hand, the amounts of dyes effectively included in the macromolecular chains can, in certain cases, be extremely slight.

Now it has been found, according to the present invention, that it is possible to obtain structurally dyed, water insoluble, macromolecular materials, with considerable reaction speeds at low temperature and with good color yields by using copolymers of acrylamide and dyes as reactive prepolymers for copolymerization with base monomers. The use of the acrylamide makes it possible to solubilize insoluble dyes and facilitates further copolymerization with unsaturated monomers.

Any dye having a polymerizable double bond may be used for purposes of the present invention.

For example, representative dyes suitable for the present invention are dyes which belong to the azo, anthraquinone, pyrazolanthrone, phthalocyanine classes and which bear one or more groups of the formula:

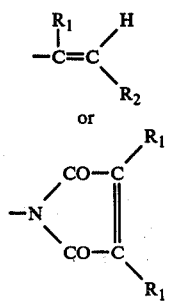

wherein $R_1$ is a hydrogen atom or an alkyl group having 1 to 4 carbon atoms, $R_2$ is a hydrogen atom, a halogen atom (particularly chlorine), a cyano group, a carboxy group, a carbonamido group or an alkoxycarbonyl group with 1 to 4 carbon atoms in the alkoxy chain, said groups being attached to a cyclic carbon atom of an aromatic nucleus of the dye molecule either directly or through an oxygen or sulfur atom or a

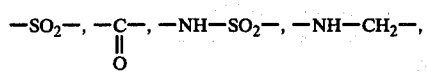

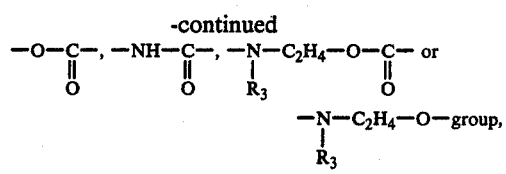

$R_3$ being hydrogen or alkyl with 1 to 4 carbon atoms.

Examples of dyes containing one or more groups of the above mentioned formula are the dyes having as a substituent on an aromatic nucleus, a maleimido, acryloylamino or cyanovinyl group. More particularly, the following dyes are representative:

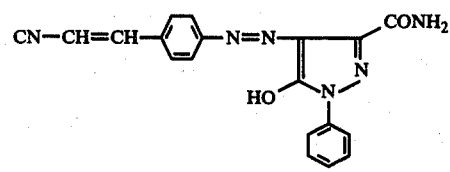

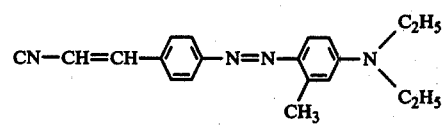

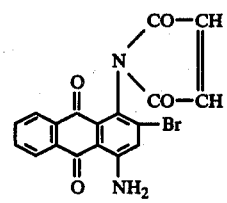

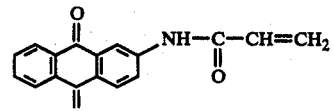

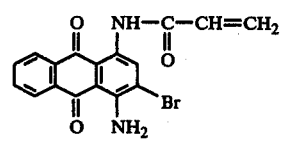

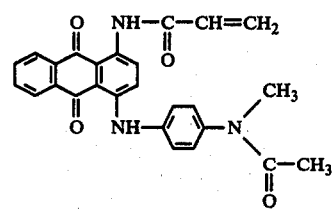

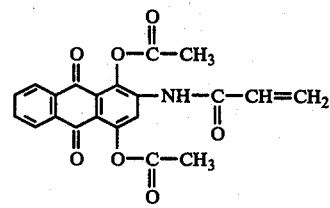

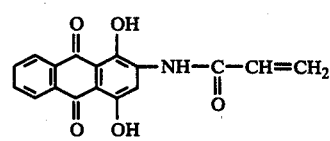

-continued

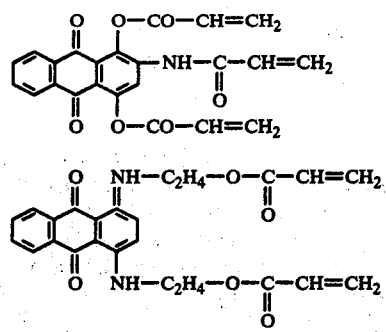

A large number of dyes having a polymerizable double bond are known (see, for example, the British Pat. Nos. 830,876; 1,309,876; 1,309,877 and the U.S. Pat. Nos. 3,503,087; 3,637,596; 3,557,048; the entire disclosures of which patents are relied on and incorporated herein by reference).

Certain new dyes have proven to be particularly advantageous for preparation of the prepolymers that can be used for the fabrication of macromolecular materials according to the invention.

They can be represented by the following formulas:

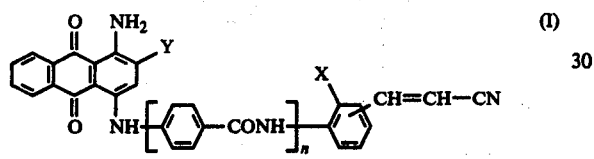
(I)

wherein Y represents a hydrogen atom or a sulfo group, X represents a hydrogen or chlorine atom, n represents 0 or 1, and the cyanovinyl group is in position 3, 4 or 5;

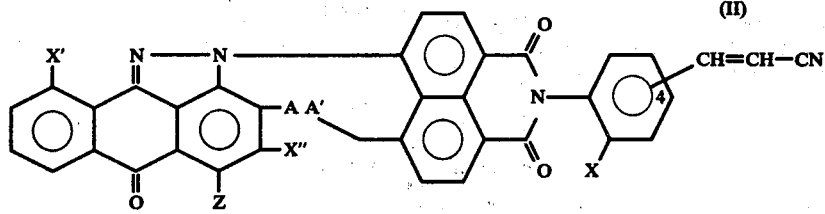
(II)

wherein X, X', X" represent hydrogen or halogen atoms, Z represents a hydrogen atom, a lower alkyl group or a benzamido group, the cyanovinyl group is in position 3, 4 or 5; A represents a hydrogen or halogen atom or lower alkyl group; A' represents a hydrogen atom, and AA' can be a covalent bond.

In the above formula, halogen means chlorine, bromine, iodine and fluorine with chlorine preferred.

By lower alkyl group is meant alkyl group having 1 to 4 carbon atoms.

Examples of dyes of formula (I) include those compounds wherein Y is a hydrogen atom or a sulfo group, X represents a hydrogen atom, n is 0 or 1, and the cyanovinyl group is in position 4.

Dyes of formula (I) may be prepared by conventional means by reacting an anthraquinone of the general formula:

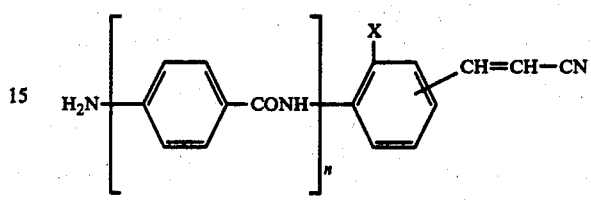

with an amine of the general formula:

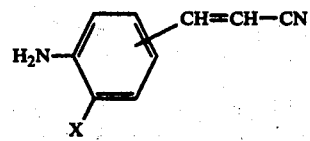

X, Y, n having the same significations as in formula (I).

The dyes of formula II can be prepared by condensation of 4-bromo naphthalic anhydride with an amine of the general formula:

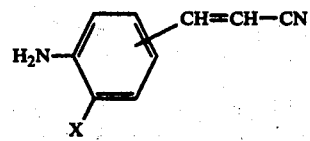

and the reaction of the naphthalimide thus obtained with a pyrazolanthrone of the formula:

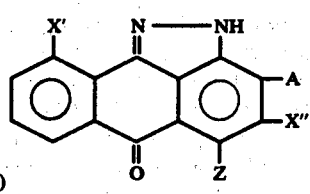

A, X, X', X" and Z have the same significations as in formula (II). When A represents a halogen atom, the 4-(2-halogeno pyrazolanthronyl) N-(3, 4 or 5-cyanovinyl phenyl) naphthalimides obtained can be subjected to a further ring closure by elimination of halohydric acid in a sulfuric medium.

The base monomers that can be used to prepare the macromolecular materials by copolymerization with the dyed prepolymers are colorless monomers having one or several polymerizable double bonds. Examples of ethylenically unsaturated monomers are:
  styrene and its substituted derivatives,
  divinylbenzene,
  polybutadiene oligomers having vinyl groups, acrylic, methacrylic, crotonic, chloroacrylic, maleic and itaconic acids and their anhydrides, nitriles, esters, amides, N-monoalkyl amides and N-dialkylamides, ethyleneglycol diacrylate, methylene-bis-acrylamide and methylene-bis-methacrylamide, vinyl esters of saturated carboxylic acids (particularly vinyl acetate), vinyl halides and vinylidene halides (particularly vinyl chloride), vinylpyridines, vinylpyrrolidines, vinylquinolines, N-vinyl-imidazole, N-vinyl-carbazole, N-vinyl-pyrolidones or N-vinyl-caprolactam.

These monomers may be used alone or in mixtures with each other.

The amount of dyes and acrylamide used to prepare the prepolymers are selected in consideration of the intended purpose of the prepolymers. If they are intended for preparation of macromolecular materials directly usable, for example, for fabrication of dyed yarns or molded objects, the proportions of acrylamide can vary from 0.5% to 50% by weight in relation to the base monomers to be dyed; the proportions of dyes can vary from 0.1 to 2% in relation to the base monomers.

If the prepolymers are intended for preparing macromolecular materials used, as master mixtures, for dyeing in the mass of synthetic fibers and resins, the proportions of dye can vary from 2 to 25% and those of acrylamide from 0.5 to 50% by weight in relation to the monomers used.

The structurally dyed macromolecular materials according to the invention may be obtained by free radical polymerization of the monomers in an aqueous medium, at a temperature from 0° C. to 100° C., preferably from 20° C. to 50° C. in the presence of a polymerization initiator. This initiator is preferably a tetravalent cerium complex, that is to say, a complex of cerium (IV) with polyhydroxy or polyamino compounds. Representative complexes are for example, glucose-cerium (IV), saccharose-cerium (IV), and cellulose-cerium (IV) complexes.

The polymerization reaction comprises two stages. In the first stage, the dye and the acrylamide are reacted in the aqueous medium, in the presence of the initiator, during a limited time, which may be from 30 seconds to 5 minutes. In the second stage, the base monomers are introduced in the polymerization medium and the polymerization reaction is run to completion.

During the first stage, the reaction between acrylamide and dye is not complete. Reactive prepolymers of dye-acrylamide are formed. These prepolymers, which are oligomers of dye and acrylamide, that is to say, short chain copolymers of dye and and acrylamide will react in situ with the base monomers and the remaining free dye and acrylamide during the second stage.

As it will be apparent to one of ordinary skill in the art, the macromolecular materials thus obtained are random copolymers and not graft copolymers.

The macromolecular materials dyed by means of these prepolymers have uniform, bright and stable colorations. The process according to the invention, which can be applied to very different types of dyeing structures makes it possible to obtain copolymers of widely varying shades. The inclusion of dyes as integral parts of the chains was established, on the one hand, by infrared spectrography and nuclear magnetic resonance spectrography and, on the other hand, by the impossibility of separating the dye from the polymer support by solvents.

In the following illustrative examples all parts indicated are by weight unless indicated to the contrary.

EXAMPLE 1

There are mixed, cold, with stirring 3.2 parts of 2-bromo 1,4-diamino anthraquinone, 100 parts of maleic anhydride and 100 parts of acetic anhydride. After 10 minutes of stirring, there are added 30 parts of sodium acetate and the mixture is brought to reflux. The reaction product is then poured into water under very vigorous stirring. There are obtained, after filtering, washing and drying, 37 parts of a violet brown product whose analysis shows that it is 1-maleimido 2-bromo 4-amino anthraquinone.

Into a solution, kept at 35° C., containing 2 parts of glucose, 2 parts of acrylamide, and 150 parts of water is introduced 0.5 part of dye prepared as above. After desoxygenation of the solution by passage of a nitrogen current, there is rapidly introduced with stirring, 0.5 part of cerium (IV) and ammonium nitrate in solution in 5 parts of water acidified by nitric acid. After 1 minute, there are introduced 20 parts of acrylonitrile (propenenitrile) and the reaction is continued for a half hour. There are obtained 5 parts of a violet brown polymer whose coloration remains stable after 48 hours of extraction with methylene chloride under reflux and whose intrinsic viscosity is 6.3 dl.g$^{-1}$ in dimethylformamide at 25° C. This polymer is directly usable for fabrication of dyed polyacrylic fibers.

EXAMPLE 2

Operating according to the process of example 1, but with 2-acryloylamino anthraquinone as the dye, there are obtained 6.5 parts of orange polymer with intrinsic viscosity 5.7 dl.g$^{-1}$ in dimethylformamide at 25° C. This polymer is directly usable for fabrication of dyed polyacrylic fibers.

EXAMPLE 3

Into 60 parts of water are added 5.8 parts of 1-bromo 3-sulfo 4-amino anthraquinone, 5.2 parts of [N(4-cyanovinyl phenyl)4-carboxamido] aniline, 1.5 parts of anhydrous sodium carbonate, 5 parts of sodium bicarbonate and 0.5 parts of cuprous chloride. The mixture is heated for 20 hours under nitrogen at 65° C. The precipitate is filtered, washed, taken up with acidified water at 70° C., filtered, washed and dried.

Into a reactor having a thermostat and provided with an agitation device and a nitrogen intake tube are placed 50 parts of water, 2 parts of glucose, 0.5 parts of dye obtained above, N$_1$[N(4-cyanovinyl phenyl)4-carboxamido phenyl] 1,4-diamino-3-sulfo anthraquinone, and 5 parts of acrylamide. The mixture is heated at 40° C. under nitrogen and 0.5 parts of cerium (IV) and ammonium nitrate is introduced. Polymerization is allowed to continue for 2 minutes and there are rapidly introduced 20 parts of acrylonitrile and 25 parts by volume of vinyl acetate. The mixture is subjected to agitation for an hour and then the excess monomers are distilled under vacuum; the blue polymer obtained is filtered, washed, and dried. This polymer is directly usable for making dyed molded objects.

EXAMPLE 4

Into 250 parts of anhydrous nitrobenzene are added 15 parts of pyrazolanthrone, 14 parts of anhydrous potassium carbonate, 27.5 parts of 4'-bromo 4-naphthalimido cinnamonitrile and 2 parts of cuprous chloride. The mixture is brought to reflux for 16 hours. After cooling, it is filtered; the precipitate is taken up in acidified water by boiling, filtered and dried. There are obtained 32 parts of the dye of the formula:

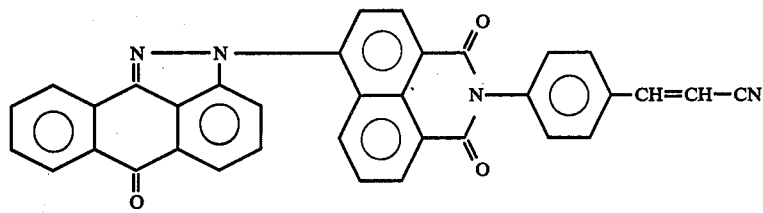

This dye is made to react with acrylamide according to the process described in Example 3. A dark green copolymer with perfectly uniform coloration is obtained.

This product, incorporated into a polyacrylonitrile dimethyl formamide collodion, makes it possible to obtain, according to known methods, yarns of polyacrylonitrile of green coloration that is particularly homogeneous.

What is claimed is:

1. A structurally dyed, water insoluble, macromolecular material containing in copolymerized form, acrylamide, at least one azo, anthraquinone, pyrazolanthrone or phthalocyanine dye having at least one group of the formula:

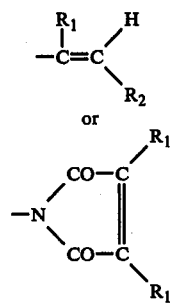

wherein $R_1$ is hydrogen or alkyl having 1 to 4 carbon atoms, $R_2$ is hydrogen, halogen, cyano, carboxy, carbonamido or alkoxycarbonyl with 1 to 4 carbons in the alkoxy chain, said groups being attached to a cyclic carbon atom of an aromatic nucleus of the dye molecule either directly or through an oxygen or sulfur atom or a

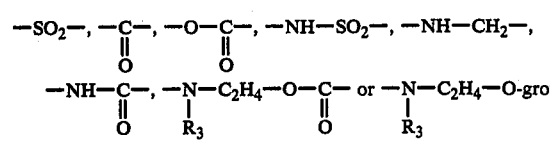

$R_3$ being hydrogen or alkyl with 1 to 4 carbon atoms, at least one colorless base monomer selected from the group consisting of:
styrene and its substituted derivatives,
divinylbenzene,
polybutadiene oligomers having vinyl groups,
acrylic, methacrylic, crotonic, chloroacrylic, maleic, and itaconic acids and their anhydrides, nitriles, esters, amides, N-monoalkyl amides and N-dialkylamides,
ethyleneglycol diacrylate,
methylene-bis-acrylamide and methylene-bis-methacrylamide,
vinyl esters of saturated carboxylic acids,
vinyl halides and vinylidene halides,
vinylpyridines, vinylpyrrolidines, vinylquinolines, and
N-vinyl-imidazole, N-vinyl-carbazole, N-vinylpyrolidones of N-vinyl-caprolactam, obtained by first copolymerizing for 30 seconds to 5 minutes, in an aqueous medium and at a temperature from 0° C. to 100° C., in the presence of a tetravalent cerium complex as initiator, the dye with the acrylamide to form a reactive prepolymer, and then reacting in situ said prepolymers with the base monomer and the remaining free dye and acrylamide, the amount of dye being from 0.1 to 25% by weight of the base monomer and the amount of acrylamide being from 0.5 to 50% by weight of the base monomer.

2. A structurally dyed macromolecular material as defined in claim 1 wherein said dye is an anthraquinone dye of the general formula:

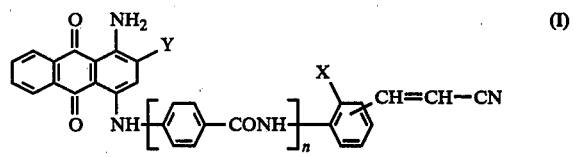

wherein
Y represents hydrogen or sulfo,
X represents hydrogen or chlorine,
n represents 0 or 1, and
the cyanovinyl group is in position 3, 4 or 5.

3. A structurally dyed macromolecular material as defined in claim 1 wherein said dye is a pyrazolanthrone dye of the general formula:

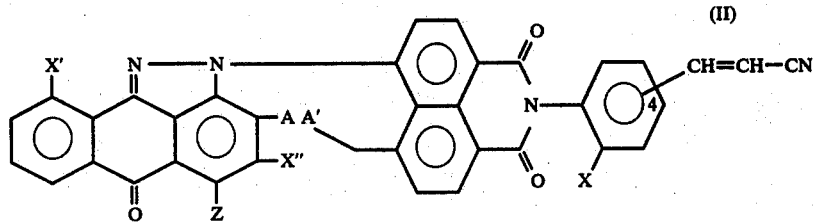
wherein
X, X', X" represents hydrogen or halogen,
Z represents hydrogen, lower alkyl or benzamido,
the cyanovinyl is in position 3, 4 or 5,
A represents hydrogen, halogen or lower alkyl,
A' represents hydrogen, and
AA' may be a covalent bond.
* * * * *